United States Patent
Thellier

(10) Patent No.: US 11,161,698 B2
(45) Date of Patent: Nov. 2, 2021

(54) DEVICE COMPRISING TWO SUPPORTS

(71) Applicant: SAINT-GOBAIN GLASS FRANCE, Courbevoie (FR)

(72) Inventor: Hervé Thellier, Pimprez (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 203 days.

(21) Appl. No.: 16/488,817

(22) PCT Filed: Feb. 22, 2018

(86) PCT No.: PCT/FR2018/050420
§ 371 (c)(1),
(2) Date: Aug. 26, 2019

(87) PCT Pub. No.: WO2018/154243
PCT Pub. Date: Aug. 30, 2018

(65) Prior Publication Data
US 2021/0130111 A1    May 6, 2021

(30) Foreign Application Priority Data

Feb. 27, 2017 (FR) .................................... 1751547
Feb. 27, 2017 (FR) .................................... 1751568
Feb. 27, 2017 (FR) .................................... 1751573

(51) Int. Cl.
*B65G 49/06* (2006.01)
*C03B 35/20* (2006.01)
*C03B 40/00* (2006.01)

(52) U.S. Cl.
CPC ......... *B65G 49/067* (2013.01); *B65G 49/061* (2013.01); *C03B 35/207* (2013.01); *C03B 40/005* (2013.01)

(58) Field of Classification Search
CPC .... B65G 49/061; B65G 49/067; B65G 47/90; B65G 47/901; B65G 47/902; C03B 35/14;
(Continued)

(56) References Cited

U.S. PATENT DOCUMENTS 4,956,001 A    9/1990 Kitagawa et al.
5,788,868 A *  8/1998 Itaba ................. H01L 21/67173
                                                    216/41
(Continued)

FOREIGN PATENT DOCUMENTS

CN    203712702 A    7/2014
FR    2 638 155 A1   4/1990
(Continued)

OTHER PUBLICATIONS

Office Action as issued in Indian Patent Application No. 201917033613, dated Jul. 31, 2020.
(Continued)

*Primary Examiner* — William R Harp
(74) *Attorney, Agent, or Firm* — Pilsbury Winthrop Shaw Pittman LLP

(57) ABSTRACT

A device for supporting a sheet of glass, in a contact band between the edge and up to 200 mm from the edge of the glass, includes first and second supports that each include a chassis and a support system for supporting the glass connected to the chassis, the support system of each support including a surface for supporting the glass including a fibrous material able to contact the glass in the contact band at a temperature between 400 and 600° C., the two supports being movable in a transfer vertical relative movement enabling the support surface of one to pass over or under the support surface of the other in order to transfer the glass from one support to the other, the support system of the first
(Continued)

support including a passage to allow to pass an arm connected to the second support during the transfer vertical relative movement.

23 Claims, 4 Drawing Sheets

(58) Field of Classification Search
CPC ............... C03B 35/202; C03B 35/207; H01L 21/68785; H01L 21/68764; H01L 21/68742; H01L 21/6875

See application file for complete search history.

(56) References Cited

U.S. PATENT DOCUMENTS

| | | |
|---|---|---|
| 6,698,243 B1 | 3/2004 | Yoshizawa |
| 7,547,175 B2 * | 6/2009 | Chinbe ............. H01L 21/67766 414/217.1 |
| 2004/0094979 A1 | 5/2004 | Damhuis |
| 2006/0043747 A1 | 3/2006 | Kniss |
| 2008/0011918 A1 | 1/2008 | Bruce et al. |

FOREIGN PATENT DOCUMENTS

| | | |
|---|---|---|
| GB | 2 467 952 A | 8/2010 |
| JP | H10-279049 A | 10/1998 |
| JP | 2003-341486 A | 12/2003 |

OTHER PUBLICATIONS

Office Action as issued in Chinese Patent Application No. 201880001612.9, dated Jul. 23, 2020.

International Search Report as issued in International Patent Application No. PCT/FR2018/050420, dated Jun. 12, 2018.

* cited by examiner

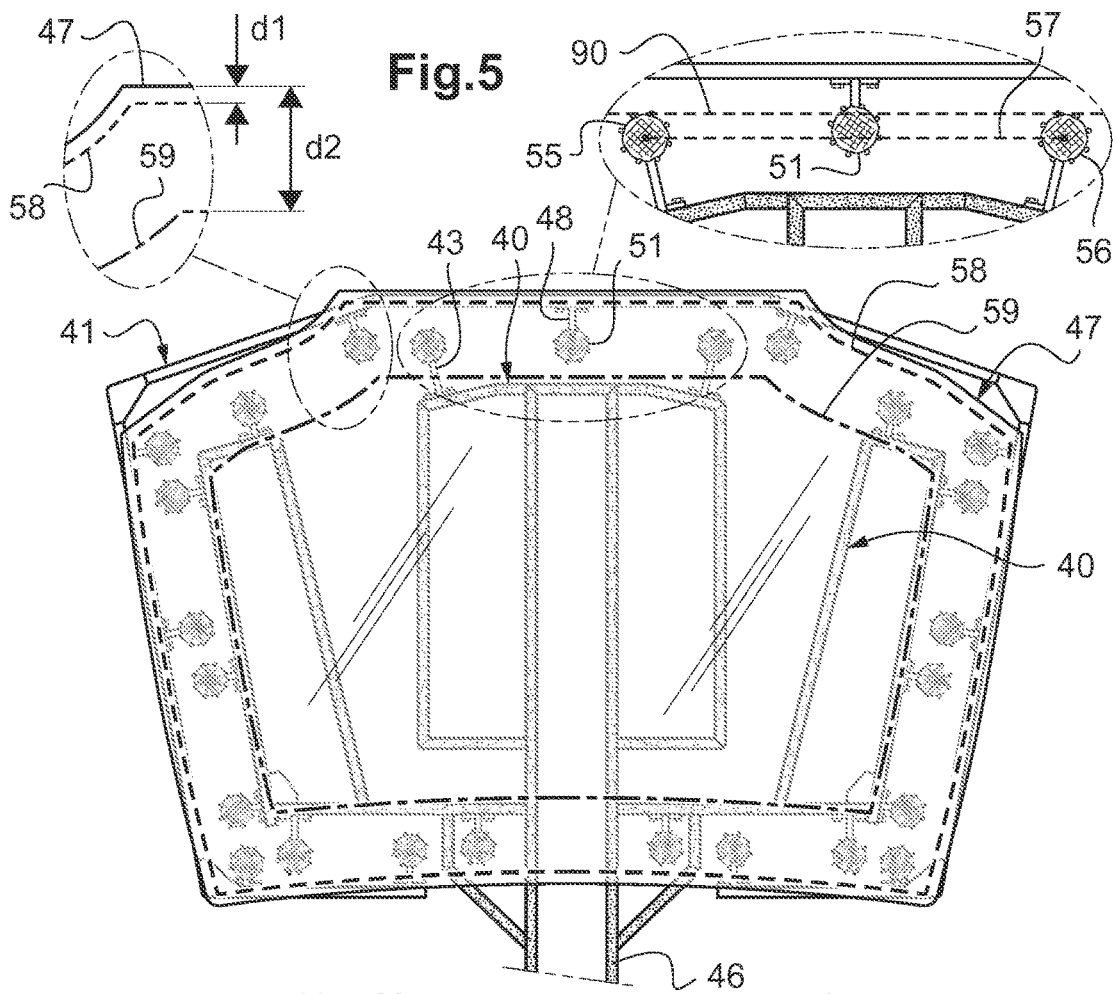
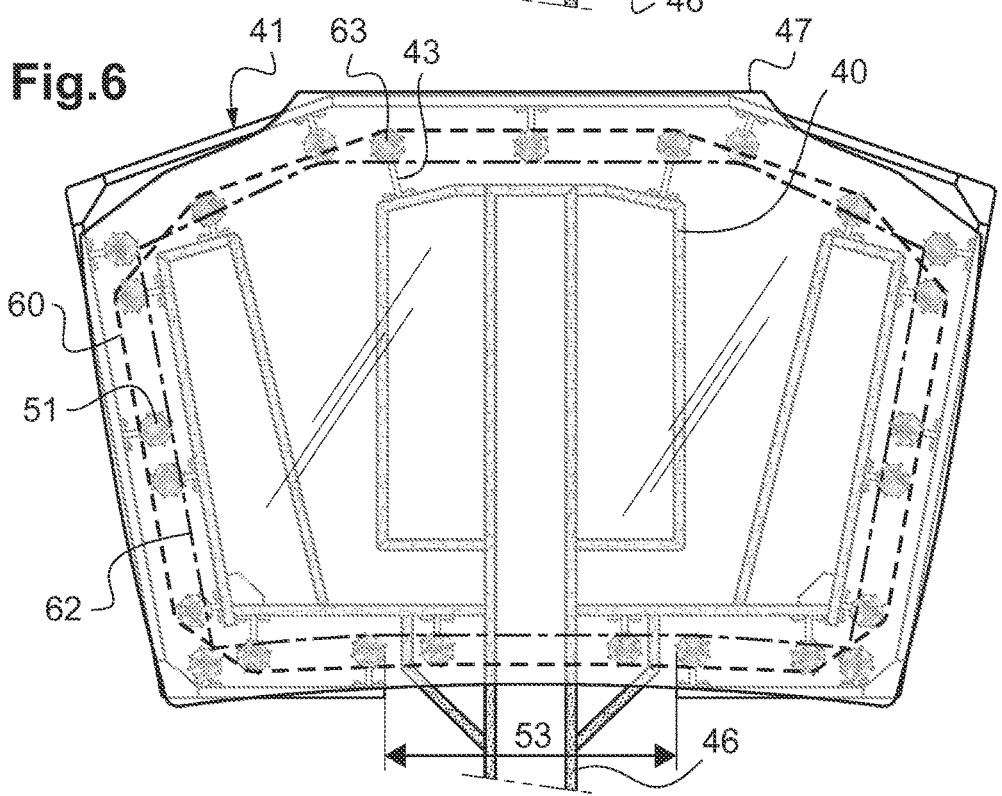

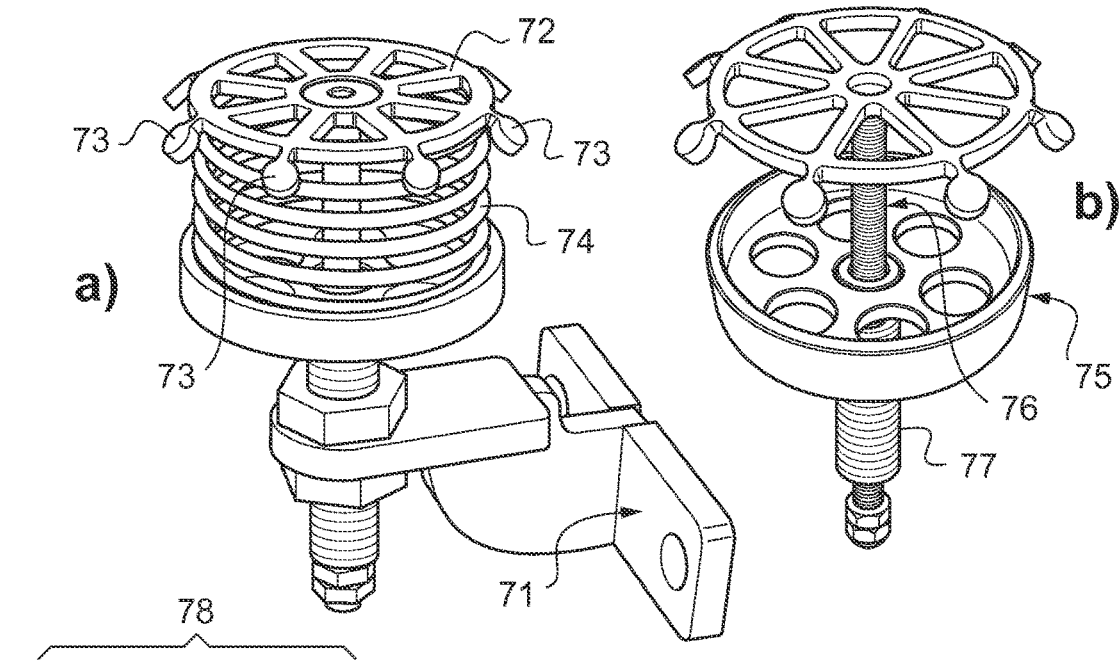
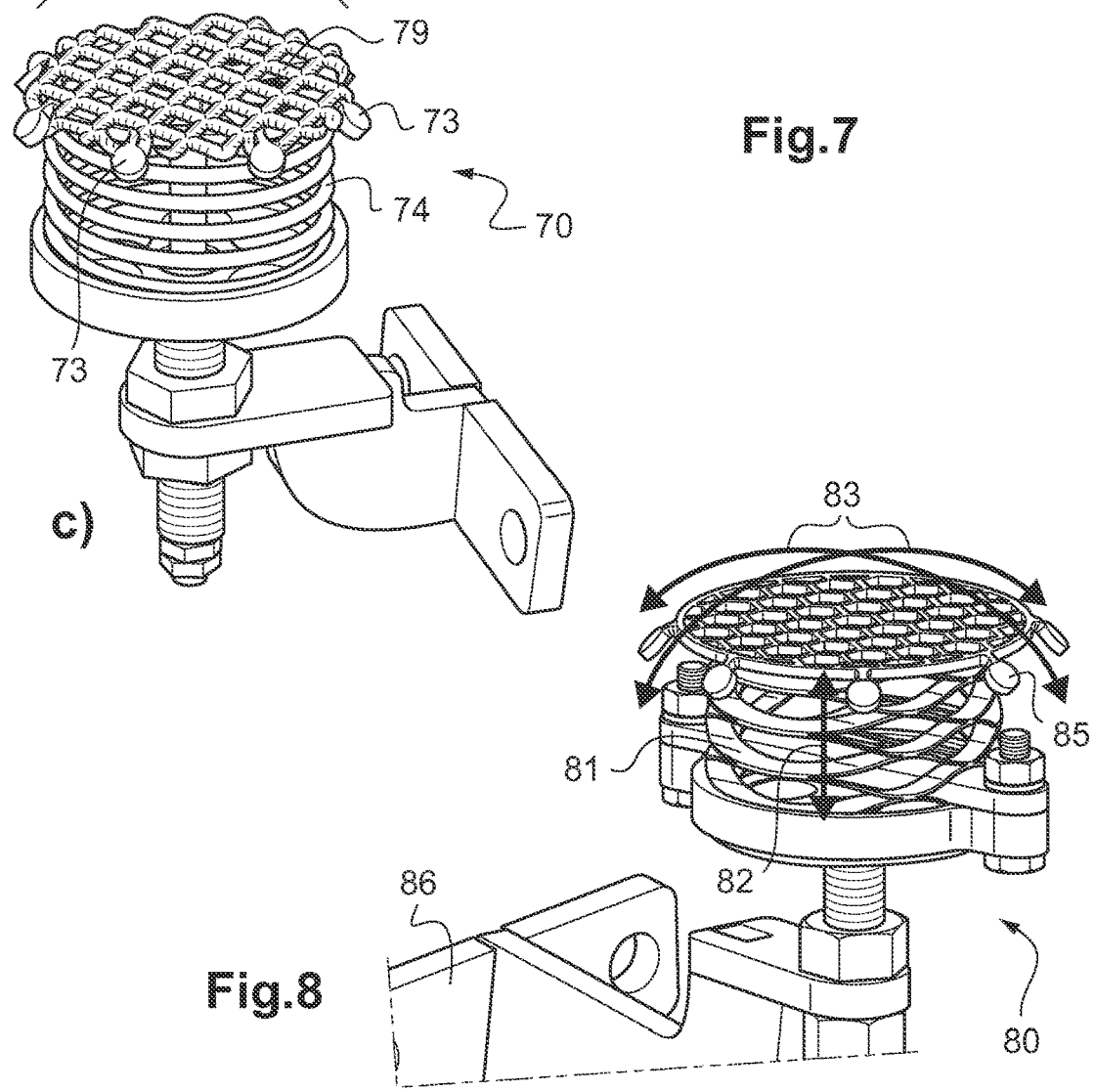
Fig.7
Fig.8

DEVICE COMPRISING TWO SUPPORTS

CROSS REFERENCE TO RELATED APPLICATIONS

This application is the U.S. National Stage of PCT/FR2018/050420, filed Feb. 22, 2018, which in turn claims priority to French Patent Application No. 1751568 filed Feb. 27, 2017, French Patent Application No. 1751547 filed Feb. 27, 2017 and French Patent Application No. 1751573 filed Feb. 27, 2017, the entire contents of all applications are incorporated herein by reference in their entireties.

FIELD

The invention concerns a device for supporting a sheet of glass or a stack of sheets of glass, termed the glass.

BACKGROUND

A method of manufacturing sheets of glass necessitates conveying the sheets in different stations in which they are cut, heated, bent, cooled, etc. Various means for supporting and conveying them exist such as beds of rollers, gravity forming tools, tempering tracks, air cushions, suction upper forming molds (also called pick-ups), etc, each such means having their advantages and their disadvantages depending on circumstances.

SUMMARY

The device according to the invention more particularly comprises two supports supporting the glass successively, the second being able to take charge of the glass by offloading it from the first or to offload the glass that it is carrying onto the first. The invention is of benefit in particular for handling sheets of glass, in particular during the manufacturing process thereof, in particular while they are cooling following thermal bending thereof. Thus the device according to the invention supports and is able to convey the glass.

In an aspect of the invention, there is provided a device for supporting a sheet of glass or a stack of sheets of glass in a contact band between an edge of the glass and up to 200 mm from the edge of the glass, without contacting the glass beyond 200 mm from the edge of the glass, the device comprising a first support and a second support, each of the first and second supports comprising a chassis and a support system adapted to support the glass connected to the chassis, the support system of each of the first and second supports comprising a surface for supporting the glass comprising a fibrous material able to contact the glass in the contact band at a temperature between 400 and 600° C., the first and second supports being able to be moved in a transfer vertical relative movement enabling the support surface of one to pass over or under the support surface of the other in order to transfer the glass from one of the first and second supports to the other one of the first and second supports, the support system of the first support comprising a passage able to allow to pass an arm connected to the second support during the transfer vertical relative movement In another aspect of the invention, there is provided method for supporting a sheet of glass or a stack of sheets of glass, termed the glass, by the foregoing device, comprising supporting the glass by one of the first and second supports, then relative positioning of the first and second supports so that the first and second supports are under the glass, then executing the transfer vertical relative movement of the first and second supports to transfer the glass from one of the first and second supports to the other one of the first and second supports, during which the arm connected to the second support passes through the passage of the support system of the first support.

BRIEF DESCRIPTION OF THE DRAWINGS

FIG. 5 shows, seen from above and in orthogonal projection in a horizontal plane, the supports from FIGS. 4a-c at the moment of the transfer of the glass from one support to the other;

FIG. 6 represents a view from above of the same device as FIG. 5, the two supports being in the transfer situation;

FIGS. 7a-c show a support element that can equip a support according to an embodiment of the invention, and FIG. 8 shows a mobile support element that can equip a support according to an embodiment of the invention.

DETAILED DESCRIPTION

Figure 1:
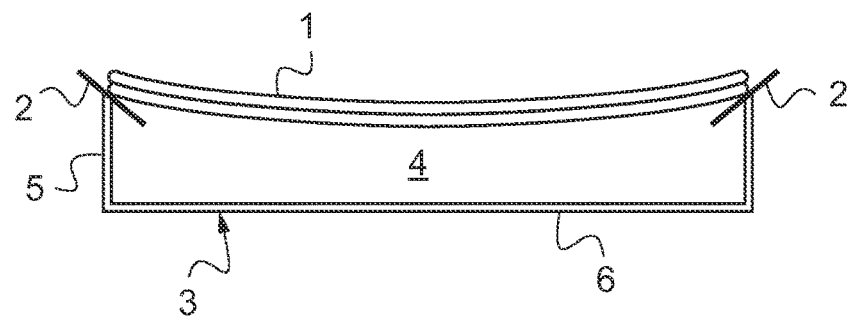
FIG. 1 shows seen from the side a stack of two bent glass sheets supported by a support including a peripheral track type support surface.

A device has now been designed enabling a sheet of glass or a stack of sheets of glass, termed the glass, to be supported and to be moved from one place to another by contact with its lower face. In particular, the support zones on the lower face of the glass may be specifically chosen. There is no necessity to come into contact with the upper face of the glass.

The device according to the invention comprises two distinct supports for supporting the glass one after the other. Two variants are distinguished. According to a first variant the glass is first supported by the first support and then the second support which is empty at this stage is positioned under the glass (following movement of one or the other of the supports or of the two supports), after which, following vertical relative movement of the two supports that causes them to cross over (seen from the side), the second support takes charge of the glass by offloading it from the first support, after which the two supports are moved away from one another, the second support carrying the glass. According to a second variant, the glass is first supported by the second support, after which the second support carrying the glass is positioned over the first support, which is empty at this stage (following movement of one or the other of the supports or of the two supports), after which, following vertical relative movement of the two supports causing them to cross (seen from the side), the first support takes charge of the glass by offloading it from the second support, after which the two supports are moved away from one another, the first support carrying the glass.

The glass is therefore transferred from one support to the other and this is made possible thanks to a compatible geometry of the two supports with one another such that these two supports do not touch when they cross at the moment of the transfer. At the moment of the transfer, seen from above, the two supports are under the glass. In this present application, this particular situation is termed the transfer situation, whichever support is above the other one and whether this is before or after transfer. The glass is transferred from one support to the other during vertical relative movement of the two supports in the transfer situation, during which the heights of the support surfaces of the two supports are interchanged. The second support may be provided with an arm connected to its chassis, that arm enabling it to be held or to be moved, for example by automatic mechanical means (such as a robot). The arm is fixed to the chassis or is a removable element that can be fixed to and detached from the chassis. Seen from above, the arm is an element external to the chassis and to the support surface of the second support. The arm is connected by one of its ends to the part of the chassis directly carrying the support means for the glass and its other end is moved away from this part of the chassis and the support surface. When the two supports are in the transfer situation under the glass carried by one of the supports, that other end can be seen as being moved away from the glass/supports combination. The arm generally has a substantially horizontal principal direction.

The device according to the invention is of benefit in particular during the process of cooling sheets of glass following thermal bending thereof. In fact, by way of example, the first support supporting the glass may be placed in a chamber at a particular temperature, after which the second support comes to take charge of the glass to exit it from the chamber and to move it into a cooler zone. The first support can then receive the next glass. The invention is therefore particularly suitable for processes treating sheets of glass moving one behind the other.

The invention concerns firstly a device for supporting a sheet of glass or a stack of sheets of glass, termed the glass, said device comprising a first support and a second support, each of those supports comprising a chassis and glass support means connected to the chassis, the support means of each support having a glass support surface, the two supports being able to be driven with a transfer vertical relative movement enabling the support surface of one to pass over or under the support surface of the other in order to transfer the glass from one support to the other, the support means of the first support including a passage able to allow an arm connected to the second support to pass during the vertical relative movement.

The expression vertical relative movement means that only one or the other of the supports is moved vertically or that the two supports are moved vertically during this movement.

The device is in particular adapted to support a sheet of glass or a stack of sheets of glass, in which case the present application simply refers to "glass". The lower face of the glass is supported turn and turn about by the two supports, this face being able to be plane or bent. The invention more particularly concerns the field of handling hot bent glass, notably between 400 and 600° C., in the context of a method of manufacturing windows for wheeled vehicles (automobile, truck, bus, agricultural vehicles).

The support surface of a support may be continuous as is the case of a peripheral track. The support surface of a support may also be discontinuous. In the latter case, the support comprises a plurality of support elements each fixed to the chassis and each including a glass contact zone. The set of contact zones forms the support surface. A support element may be connected to the chassis by one of its ends and include the contact zone at its other end. The contact zone is generally higher than the end by which the support element is fixed to the chassis. The fact that the support surface is discontinuous has the advantage of being able to adjust each contact zone independently of the others more easily, in order for this surface to be at the correct height and to have the best orientation relative to the glass to be supported. Each support element may also include independent means for damping the reception of the glass. Moreover, in the case of hot glass during cooling, air can circulate between the various contact areas.

The support means of one of the supports can therefore include a plurality of support elements fixed to the chassis and each including a glass contact zone, the set of contact zones of the support elements of the support forming a discontinuous support surface for the glass specific to that support. The two supports may be of this type.

For it to be possible for the glass to be transferred from one support to the other, it is necessary that the supports do not impede the vertical relative movement at the moment of transferring the glass from one support to the other. The geometries of these two supports must therefore be compatible to allow this movement. As a result, the two supports are able to pass one through the other during the transfer. Seen from the side, they cross. In particular, the support means of the first support include a passage enabling the arm of the second support to pass during the vertical relative movement. This passage generally has a width in the range from 5 cm to 65 cm and more generally from 10 to 50 cm. Likewise, seen from above, the support means of one support must not be at the same location as the support means of the other support. Seen from above in the transfer situation, the support surfaces of the two supports must be seen to be offset in order for the two supports not to touch one another during the transfer. Seen from above, the support surfaces of the two supports are seen to be separate, not superposed, and not able to touch one another during the vertical relative movement. For example, the second support may be such that its support surface (as well as its chassis) is entirely circumscribed by the support surface of the first support seen from above when the supports are in the transfer situation.

In the situation in which the two supports each include a plurality of support elements fixed to the chassis, those support elements may be configured so that, seen from above

- the support elements of the first support are directed (starting from the chassis) toward the interior of the chassis of the first support,
- the support elements of the second support are directed (starting from the chassis) toward the exterior of the chassis of the second support,
- the support elements of the two supports are offset seen from above during the transfer vertical relative movement.

As a result, during the transfer vertical relative movement, the support elements of the two supports may cross over like the teeth of two combs. This configuration enables the two supports to support substantially the same zone of the glass, that is to say to support it at substantially the same distance from its edge. According to this principle, when the two supports are in the transfer situation, seen from above and in orthogonal projection in a horizontal plane, there may in particular be at least one support element of the first support intersecting the straight line tangential to the exterior edges of two contact zones of adjacent support elements of the second support, this intersection occurring between the two adjacent support elements of the second support. The intersection may occur, seen from above and in orthogonal projection in a substantially horizontal plane, either in the contact zone or in the part of the support element connecting the chassis to the contact zone. This situation may be repeated several times, in particular for at least 2, or even at least 3, or even at least 4, or even at least 5, or even at least 6 or more support elements of the first support. This transfer situation configuration reflects mutual interleaving of the two groups of support elements (the group of the first support and the group of the second support). There may equally be, when the two supports are in the transfer situation, seen from above and in orthogonal projection in a horizontal plane, at least one support element of the second support intersecting the straight line tangential to the interior edges of two contact zones of adjacent support elements of the first support, that intersection occurring between the two adjacent support elements of the first support. The intersection may occur, seen from above and in orthogonal projection in a substantially horizontal plane, either in the contact zone or in the part of the support element connecting the chassis to the contact zone. This situation may be repeated several times, in particular for at least 2, or even at least 3, or even at least 4, or even at least 5, or even at least 6 or more support elements of the second support. This transfer situation configuration also reflects mutual interleaving of the groups of support elements. Also according to this principle, in the transfer situation and as seen from above, there is generally at least one pair of adjacent support elements of one of the two supports such that the straight line segment passing through the center of their contact zone intersects a support element of the other support, generally its contact zone, this intersection occurring between the two adjacent support elements (forming a pair). This situation can arise for at least two 2, or even at least 3, or even at least 4, or even at least 5 different pairs of adjacent support elements of one of the supports, given that a support element may be part of two different pairs. This property also translates the fact that the contact zones of the two supports are interleaved at the moment of transferring the glass. The intersection may involve the contact zone or any part of the support element. This transfer situation configuration reflects pronounced mutual interleaving of the two groups of support elements. The center of a contact zone is, seen from above, the barycenter of the orthogonal projection of the contact zone on a horizontal plane. That barycenter is also the geometrical center or center of mass of the projection of the zone and may be termed a "centroid" or "geometric center". It is the point on the surface of the projection of the zone corresponding to the barycenter of an object the same shape, infinitely thin and homogeneous in density.

The "interior support contour of the first support" is the shortest imaginary line touching, seen from above and in orthogonal projection in a horizontal plane, the interior edge of any contact zone of the first support, including the passage itself. The length of this line is termed the "interior support perimeter of the first support". This line comprises straight line segments between the various contact zones including in the passage itself. The "exterior support contact of the second support" is the shortest imaginary line touching, seen from above and in orthogonal projection in a horizontal plane, the exterior edge of any contact zone of the second support, including the passage itself. The length of this line is termed the "exterior support perimeter of the second support". This line comprises straight line segments between the various contact zones including in the passage itself.

According to the invention, when the two supports are in the transfer situation, seen from above and in orthogonal projection in a horizontal plane, a plurality of contact zones of the second support are at least partly outside the interior support contour of the first support. According to the invention, in the transfer situation and as seen from above, the exterior support contour of the second support is at least in part outside the interior support contour of the first support. In particular, more than 50% or even more than 80% or even more than 90% of the exterior support contour of the second support is preferably outside the interior support contour of the first support.

In particular, the interior perimeter of the contact zones of the first support may be less than 1.2 times the exterior perimeter of the contact zones of the second support, or may even be smaller than the exterior perimeter of the contact zones of the second support. This situation is the consequence of the fact that the contact zones of the two supports are interleaved like the teeth of two combs, the supports being in the transfer situation. In fact, in the transfer situation, the part of the chassis of the second support directly carrying its support means (which exclude the arm) is generally circumscribed by the contact zones of the second support, in particular the exterior support contour of the second support (and even all of the contact zones), and however the contact zones of the second support are located in the vicinity the contact zones of the first support and interleaved therewith as seen from above.

The part of the chassis of the second support on either side of the passage (which excludes the arm and the part of the chassis of the second support facing the passage), is generally entirely circumscribed by the interior support contour of the first support when the two supports are in the transfer situation and seen from above.

In the transfer situation and seen from above, the chassis of the second support (together with the support means of the second support) generally appears globally smaller and surrounded by the chassis of the first support. In the transfer situation and seen from above, the support means of the second support generally appear surrounded by the chassis of the first support.

The part of the chassis of the second support on either side of the passage (which excludes the arm and the part of the chassis of the second support facing the passage) is generally entirely circumscribed by the upper part of the chassis of the first support (extended by an imaginary line at the location of the passage), said part carrying directly the support means of the first support, seen from above when the two supports are in the transfer situation.

The chassis of the first support may include a lower part crossing the central zone of the first support seen from above in the transfer situation and connecting different parts of the first support with the aim of imparting stiffness to the first support. This lower part must not impede the passage of the second support by a horizontal movement in order for it to place its support surface under the support surface of the first support in the transfer situation. The chassis of the first support may therefore include a space situated between a lower part crossing the central zone and an upper part including the glass support surface, this space being able to receive the second support. If, to transfer the glass, the first support first supports the glass, the second support comes to be placed in this space in a transfer position under the glass by a horizontal relative movement relative to the first support, after which it takes charge of the glass by an upward vertical relative movement. It exits the space by virtue of this vertical relative movement, then taking the glass to the station carrying out the remainder of the process. If, for transferring the glass, the second support first supports the glass, the second support comes to be placed in the space in the transfer position by a vertical relative movement relative to the first support, and by that same vertical movement deposits the glass on the first support. Thereafter the second support, then empty, exits the space by a horizontal movement. The two supports may thereafter move away from one other.

During the transfer of the glass from one support to the other, the glass retains substantially the same horizontal orientation. It generally retains this substantially horizontal orientation for as long as it is supported by one or other of the two supports. The device according to the invention enables passage from one support to the other without influencing the geometry of the glass despite its high temperature.

This horizontal movement of the second support may be generated by the arm that can be actuated by automatic mechanical means (such as a robot). The use of a robot holding the arm is particularly advantageous because this enables the horizontal movement placing the second support in the transfer situation, then the vertical relative movement leading to the transfer of the glass, then movement of the second support away from the first support, whether loaded with the glass or not. An arm may therefore be connected to the second support, that arm being able to be manipulated by automatic mechanical means, in particular a robot, which is able to move the second support horizontally and vertically by means of the arm. The relative positioning of the supports to place them in the transfer situation and the vertical relative movement of the supports may be brought about by movement of the second support, in particular by the automatic mechanical means, and by means of the arm.

The passage provided in the support means of the first support for the arm connected to the second support to be able to pass during the transfer of the glass from one support to the other is generally less than 20% and even 15% of the interior support perimeter of the first support.

Each of the supports may include a plurality of support elements connected to the chassis by one end and a glass contact zone at the other end. In the case of a plurality of support elements equipping a support, the area of each contact zone of each support element may for example be in the range from 50 to 20 000 mm$^2$. The shape of this zone may be square or circular or otherwise. The two supports may include a plurality of support elements. For the situation of supporting hot glass (in particular between 400 and 600° C.) the area of each contact zone is advantageously in the range from 50 to 5 500 mm$^2$ and more generally from 500 to 4 000 mm$^2$. For supporting hot glass, any contact zone may advantageously be inscribed in a circle of 10 cm diameter and more generally of 80 mm diameter. A support including a discontinuous support surface may include at least four support elements and therefore likewise four contact zones. By way of example, for rolling vehicle glazing, one of the supports may in particular include 4 to 25 and more generally 4 to 20 support elements, in particular 6 to 20 support elements, more generally 8 to 20 support elements, each support element including a contact zone. The two supports may each include this number of support elements.

When the supports are intended to carry hot glass, in particular just after it is bent, in particular at between 400 and 600° C., it is preferable for the supports to have a relatively large number of contact zones coming into contact with the glass at a relatively short distance from the edge of the glass, in particular at 200 mm at most from the edge, in particular 170 mm at most from the edge, in particular 150 mm at most from the edge (without contact with the glass respectively beyond 200 mm, 170 mm, 150 mm from the edge). At these temperatures there is a risk of the contact zones marking the glass, that risk increasing the higher the temperature of the glass. It is therefore generally necessary to reduce as much as possible the pressure of the glass (because of its weight) on the contact zones of the support element. The fact of contacting the glass in the vicinity of the edge of the glass enables use of more support elements (because of the greater distance) and therefore distributes the weight of the glass over a larger area. In particular, the contact zones could contact the glass in a contact band between the edge (which includes the lower edge of the edge surface of the glass) and up to 200 mm from the edge of the glass and preferably up to 170 mm from the edge, and preferably up to 150 mm from the edge, without contacting the glass, respectively beyond 200 mm or 170 mm or 150 mm from its edge. In some cases, it may be advantageous for these contact zones not to come too close to the edge of the glass either, in particular when the aim is for the support not to interfere with the temperature profile of the periphery of the glass in the glass cooling phase, in particular between 500 and 560° C., or even between 490 and 575° C., these temperature ranges being critical for the formation of stresses in the glass. In this case, the contact zones could advantageously contact the glass in a contact band substantially parallel to the edge of the glass, said contact band being delimited by an exterior imaginary line and an interior imaginary line. The limits of this contact are:

exterior limit of the band: at least 50 mm and preferably at least 60 mm and preferably at least 70 mm from the edge of the glass, interior limit of the band: at most 200 mm and preferably at most 170 mm from the edge of the glass and preferably at most 150 mm from the edge of glass.

The supports may have no contact with the glass outside this contact band when the supports are in the transfer situation (which means that the glass is exclusively in contact with the surrounding air outside this contact band). The exterior and interior limits of this band are substantially parallel to the edge of the glass. Each support may support the glass by contacting it exclusively in this contact band without contact with the central zone of the glass (beyond 200 mm from the edge of the glass toward the interior). For the glass to be stable on a support, the support must have sufficient contact zones for the glass in the contact band, distributed along the contact band around the glass central zone.

The device according to the invention is therefore particularly useful for supporting and moving a glass in the context of a glass bending and cooling process including gravity bending of the glass on a gravity support during which the glass rests on the gravity support in the peripheral zone of its lower principal face (facing downward), said peripheral zone being constituted of the 50 mm from the edge of the lower principal face, then separation of the glass from the gravity support, then cooling of the glass, during which its lower principal face is free of any contact in its peripheral zone, between a temperature termed the upper homogeneous temperature of at least 560° C. (preferably at least 575° C.) and a temperature termed the lower homogeneous temperature of at most 500° C. (preferably at most 490° C.), termed the critical temperature range, the zone of the lower principal face at a distance greater than 200 mm from the edge being at a temperature at least equal to that of the peripheral zone at the moment the peripheral zone reaches the upper homogeneous temperature. In the context of this process, the device according to the invention is particularly useful for supporting the glass in the contact band while it cools and while it is still in the critical temperature range. The glass may therefore also be conveyed by this device while it is cooling by causing it to pass from a hotter chamber to another, cooler chamber. The device according to the invention does not interfere with the temperature homogeneity of the peripheral zone. As a result a finished glass may be obtained in which the edge compression stresses in its sheet including the lower principal face are greater than 8 MPa, or even greater than 10 MPa, and may even be as high as 20 MPa, and are more homogeneous along the periphery of the glass. Moreover, the tension levels may be significantly reduced, less than 5 MPa and even less than 4 MPa, and even less than 3 MPa.

In the situation of the glass supported by the device according to the invention, the area of a principal surface of the glass is generally greater than 0.5 m², in particular between 0.5 and 4 m². In the central zone of the glass, there may generally be placed an imaginary circle of at least 100 mm diameter and even of at least 200 mm diameter and even of at least and 300 mm, all points on which are farther than 200 mm from any edge of the glass, which characterizes a certain magnitude of the glass. The glass generally has four edges (also termed bands), the distance between two opposite edges generally being greater than 500 mm and more generally greater than 600 mm and more generally greater than 900 mm.

For the situation in which the two supports are both provided with a plurality of support elements forming two groups, and these two groups of elements must come into contact with the glass at a particular distance from the edge, like the contact band referred to above, then, advantageously, at the moment of transfer of the glass from one support to the other, the elements of a group are offset relative to the elements of the other group, seen from above (with the result that they do not touch when they cross during the transfer), the elements of the two groups are interleaved seen from above in the contact band, in particular an element of one group having as neighbor at least one element of the other group and generally two elements of the other group (one neighbor on each side).

As a result, the two groups of elements may cross like two combs during the vertical relative movement leading to transfer of the glass from one support to the other. Seen from above and at the moment of transfer, contact zones of the two supports appear interleaved in the contact band. The two supports can therefore both include support elements including contact zones so that all of them come into contact with the glass, in particular of glass, exclusively in a contact band at most 150 mm wide, or even at most 100 mm wide or even at most 80 mm wide, the contact zones of the two supports being at least in part interleaved in the contact band seen from above and the supports being in the transfer situation. There is nothing to rule out in the transfer situation a pair of contact zones of the same support being adjacent without interleaving of a contact zone of the other support between the contact zones of the pair. In this case, the neighbors external to the pair and on respective opposite sides of the pair are generally part of the other support. This situation is considered also to correspond to interleaving of the contact zones of the two supports, since what is essential is that contact zones of the two supports are distributed substantially equally throughout the contact band.

As the support elements are supported by a chassis, it is necessary for the support elements of the second support as well as the part of the chassis directly carrying the support elements to be able to pass through the support surface of the first support during this vertical movement. To this end, the support elements of the first support are advantageously directed inward (from the chassis to the support surface), and the support elements of the second support are advantageously directed outward (from the chassis to the support surface).

Seen from above and at the moment of the vertical movement to transfer the glass, the part of the chassis directly carrying the support elements of the second support (apart from the arm) is also advantageously circumscribed by the support elements of the first support.

Alternatively, the support means of the first support may be a peripheral track. This track is mainly continuous but includes a discontinuity forming the passage to allow the arm of the second support to pass during the transfer vertical relative movement. The peripheral track may in particular carry the glass, contacting it only by the lower edge of its edge surface (said edge therefore forming part of a contact band between the edge of the glass and a certain distance from the edge of the glass, as already referred to above), if contact is to be avoided with the peripheral zone of its lower surface (in particular in the case of hot glass at a temperature rendering it sensitive to marking). If such contact in the peripheral zone is not a problem, however, then the peripheral track may come into contact with the lower surface of the glass. According to this variant (the first support comprising a peripheral track), the support means of the second support may comprise a plurality of support elements fixed to the chassis each including a glass contact zone, the set of contact zones forming a discontinuous support surface for the glass, the set of contact zones of the second support seen from above being circumscribed by the peripheral track during the transfer vertical relative movement. Of course, to satisfy this condition, the peripheral track is virtually complete at the location of the passage.

In particular, in the case of supporting hot glass, it is recommended to cover the support surfaces with a refractory fibrous material well known to the person skilled in the art to soften the contact of the glass with a tool. This material is generally of the felt or woven or knitted type, in particular an open texture knitted material. The support surfaces of the supports may therefore comprise a fibrous material, notably of the open texture knitted material type (referred to by the person skilled in the art as "tempering knitted material"), able to contact the glass in particular at a temperature between 400 and 600° C. It has an open texture in that it is even possible to make out the source to which it is fixed through some of its meshes. Moreover, to soften further the contact with the hot glass, the support elements of one or the other support may include contact zone mobility means for the glass responsive to the weight of the glass at the moment of its reception by the support, modifying the orientation of the contact zone of the glass and/or damping the reception of the glass by the support. These means may in particular comprise a spring.

The invention also concerns a method for supporting and generally conveying glass including supporting it by the device according to the invention, including supporting the glass by one of the supports, then relative positioning of the supports so that the two supports are under the glass, then vertical relative movement of the two supports to transfer the glass from one support to the other, during which the arm connected to the second support passes through the passage of the support means of the first support.

Once the transfer has been done, the two supports may be moved away from one another, one of the supports carrying the glass.

In particular, the invention concerns a method for supporting and generally conveying glass including supporting it by the device according to the invention, including
supporting the glass by the first support, then
relative positioning of the supports so that the second support is located under the glass, then
vertical relative movement of the two supports to transfer the glass from the first support to the second support, during which the arm connected to the second support passes through the passage of the support means of the first support.

Once the transfer has been done, the two supports may be moved away from one another, the second support carrying the glass.

The invention also concerns a method for supporting and generally conveying glass including supporting it by the device according to the invention, including
supporting the glass by the second support, then
relative positioning of the supports so that the first support is located under the glass, then
vertical relative movement of the two supports to transfer the glass from the second support to the first support, during which the arm of the second support passes through the passage of the support means of the first support.

Once the transfer has been done, the two supports may be moved away from one other, the first support carrying the glass.

The glass may be any type of glass, clear or tinted, coated with at least one layer, enameled or not enameled. The glass may serve for any application in the field of rolling vehicles as windshield, rear window, side window, rear quarterlight, roof, bayflush, etc. The glass may also serve in any field other than automobiles such as construction, solar panels, specialty applications, aeronautics, glass ceramic cooking hobs, etc. The glass may have any thickness (generally in the range from 1 to 100 mm) and have any dimension, with no limit on the thickness or the dimensions of the principal faces.

The glass may comprise four bands (that is to say four edges or four sides), as in the case of windshields and rear windows of automobile vehicles, these bands not necessarily being parallel two by two or linear. The passage provided in the support means of the first support so that the arm of the second support can pass during transfer of the glass from one support to the other is generally contained entirely within a dimension corresponding to one of these bands when it is carrying the glass (whilst being located under the glass of course) and is generally located in the middle of that side. The support surfaces of the two supports may each have four sides overall. The same applies to the interior support contour of the first support and the exterior support contour of the second support. The passage of the support means of the first support is generally entirely contained in one of the sides of its support surface and is generally placed at the middle of that side. This also corresponds to one of the bands of the glass. In the transfer situation, the passage is under a band of the glass.

Support in accordance with the method may occur in the context of the manufacture of the glass, necessitating handling it from one treatment station to the other. This may in particular be a cooling treatment after bending. For example, the glass may be at a certain temperature in a chamber on the first support, after which the second support comes to fetch it to take it away from that chamber and to move it into a cooler zone. The transfer of the glass from one support to the other may therefore take place when the glass is at a temperature between 400 and 600° C.

In the present application, the term "interior" always means toward the center of the supports or of the glass, the term "exterior" meaning toward the periphery of the supports or of the glass.

The invention also concerns a device as already described except that the passage in the first support is not necessarily present or necessary. In fact, at least one vertical arm connected to one of the supports and acting under it may also be responsible for raising or lowering one or the other of the supports to effect the transfer of the glass from one support to the other. This variant is not the preferred one in that the use of an arm enabling the second support to be moved horizontally and vertically is particularly advantageous. All the technical features of the supports already described (except for the passage) can be applied to this variant, if necessary forming the subject matter of a divisional application. In particular, this variant may relate to a device for supporting glass including a first support and a second support each of those supports including a chassis and glass supporting means connected to the chassis, the support means of each support including a glass support surface, the two supports being able to be driven in a transfer vertical relative movement enabling the support surface of one of them to pass over or under the support surface of the other one in order to transfer the glass from one support to the other, the support means of the two supports each include a plurality of support elements fixed to the chassis and each including a glass contact zone, the set of contact zones of the support elements of a support forming a discontinuous glass support surface, so that on the transfer vertical relative movement there exists, seen from above, at least one support element of the first support intersecting the straight line tangential to the exterior edges of two contact zones of adjacent support elements of the second support, that intersection occurring between the two adjacent elements. This situation preferably arises for at least 2 or at least 3 or at least 4 or at least 5 or at least 6 support elements of the first support. Although the support means of the first support include (because of the discontinuity of its support surface) a passage able to allow an arm connected to the second support to pass during the transfer vertical relative movement, the use of an arm passing laterally through such a passage, although preferred, is not forcibly necessary. This variant is applicable to supports that can be interleaved in a "comb" as already described. All the technical features already described are applicable to this variant.

FIG. 1 shows seen from the side a stack of two bent glass sheets 1 supported by a support including a peripheral track type support surface 2. This support is more of a "first support" type support in the sense of the invention. The peripheral track 2 is fixed to a chassis 3. It is seen that this chassis forms a space 4 through which another support of the "second support" type in the sense of the invention may pass by a horizontal movement to go to the transfer situation and to take charge of the glass by an upward vertical relative movement. The chassis 3 includes an upper part 5 directly carrying the support means of the first support that entirely circumscribes the second support when the latter is in this space 4 (see FIG. 3). The chassis 3 includes a lower part 6. This lower part 6 can cross the central zone of the first support as seen from above and connect various parts of the first support with the aim of imparting stiffness to it. This lower part 6 does not impede the passage of the second support by a horizontal movement in order for it to be placed in the transfer situation, its support surface being located under the support surface of the first support.

Figure 2:
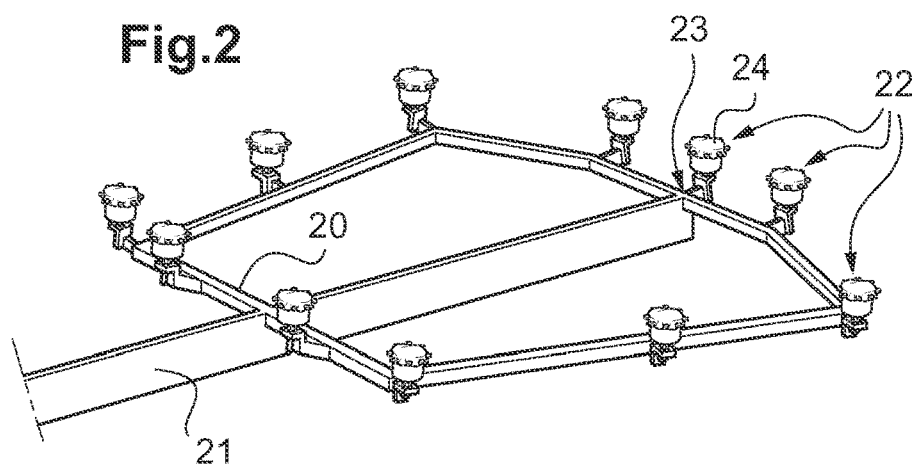
FIG. 2 shows in perspective a support of the second support type according to an embodiment of the invention.

FIG. 2 shows in perspective a support of the "second support" type in the sense of the invention. This support includes a chassis 20 provided with an arm 21. This chassis includes support elements 22 connected to the chassis 20 by one end 23 and having a contact zone 24 for the glass at the other end. Seen from above, the support elements 22 are directed outward, starting from the chassis 20 (at the end 23) and as far as the contact zone 24.

Figure 3:
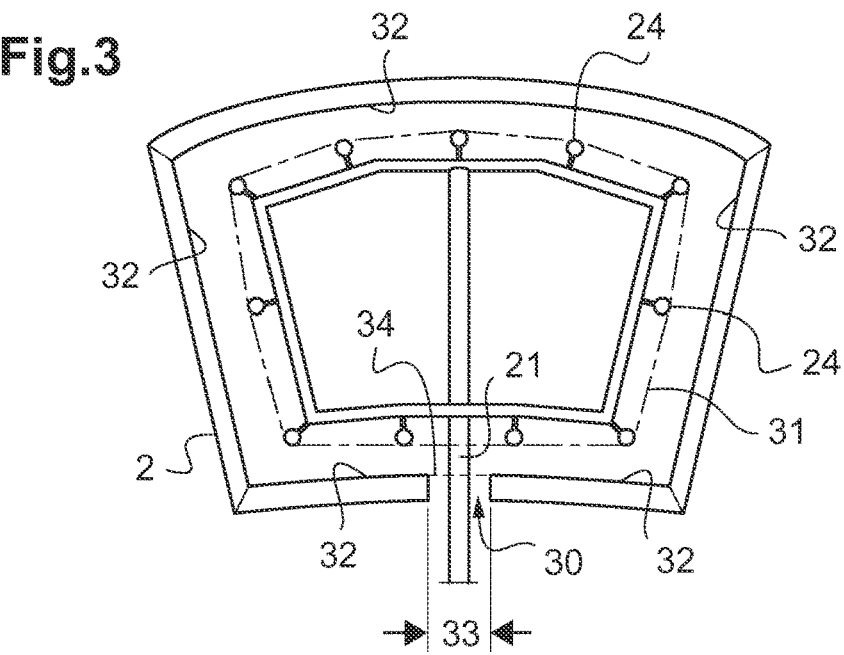
FIG. 3 shows the supports from FIGS. 1 and 2 in the transfer situation seen from above.

FIG. 3 shows the supports from FIGS. 1 and 2 in the transfer situation seen from above. The same elements from FIGS. 1, 2 and 3 bear the same reference numbers. The second support from FIG. 2 can pass through the space 4 (FIG. 1) by a first horizontal movement, then take charge of the glass carried by the first support on rising. In fact, the arm 21 is able to pass through the passage 30 provided in the support means 2 of the first support. The imaginary line 31 representing the exterior contour of the contact zones of the second support is circumscribed when seen from above by the line 32 representing the support interior contour of the first support. There is therefore nothing to impede the upward vertical movement of the second support so that it can take charge of the glass by uploading it from the first support. The interior support contour of the first support comprises all the interior sides 32 of the first support completed by the imaginary straight line segment 34 passing through the passage and connecting the two edges of the support 2 forming the passage. The width 33 of the passage 30 is less than 20% of the support interior perimeter of the first support. The opposite movement is possible: the second support (from FIG. 2) is able to carry the glass and be placed above the empty first support and then descend and be offloaded of the glass by leaving it on the first support, then exit the space 4 by a horizontal movement and move away empty. The support surfaces of the two supports each include four sides overall. In the case of the second support, these sides are more apparent starting from the imaginary line 31. The passage of the support means of the first support is entirely contained in one side and is located at the middle of that side.

Figure 4:
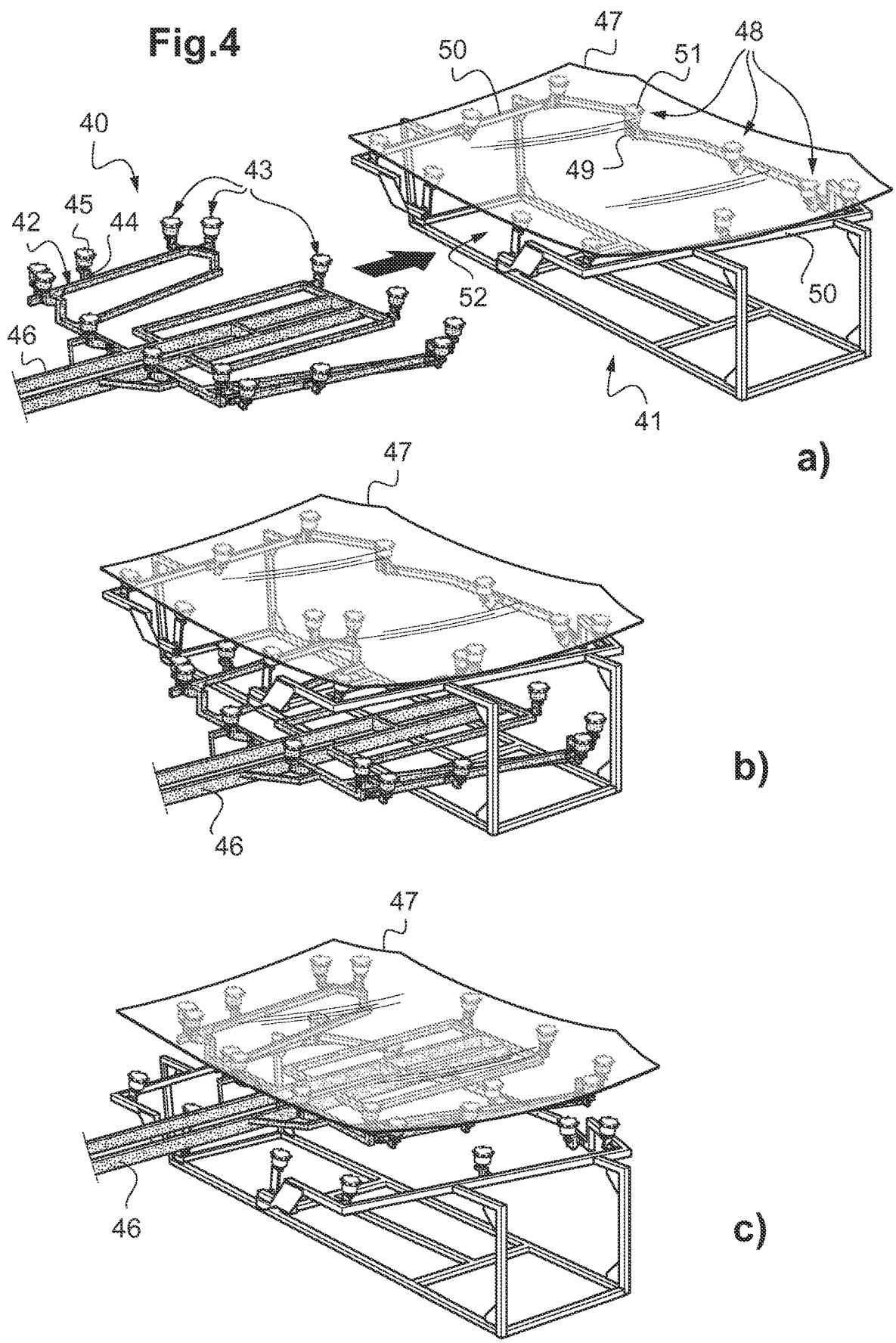
FIGS. 4a-c show sequentially how a second support may take charge of a bent glass when the latter is carried by a first support.

FIG. 4 shows sequentially how a second support 40 may take charge of a bent glass when the latter is carried by a first support 41. Here the two supports have a support surface formed by a plurality of support elements fixed to their chassis. At a) the empty second support 40, manipulated by a robot (not shown) actuating the arm 46, is moved toward the first support 41 carrying a bent sheet of glass 47. The second support 40 includes a chassis 42 carrying a plurality of support elements 43. These support elements 43 are connected by one end 44 to the chassis 42 and have at their other end a contact zone 45 to come into contact with the glass. Seen from above, the support elements 43 are directed toward the exterior of the chassis 42 in the direction from the end 44 to the end 45. At a) the first support 41 carries a sheet of glass 47 by means of a plurality of support elements 48. This first support 41 includes a chassis 50. The support elements 48 are connected by one end 49 to the chassis 50 and have at their other end 51 a contact zone that comes into contact with the glass. Seen from above, the support elements 48 are directed toward the interior of the chassis 50 starting from the end 49 and going to the end 51. The chassis 50 includes a space 52 to enable the support 40 to pass by a horizontal movement and to be positioned under the glass.

The support 40 may then rise (see phase c)) without being immobilized, thanks to the passage between the support elements 48 enabling the arm to pass. At b), the two supports are in the transfer situation, the second support 40 having been placed under the glass without yet touching it. At c), the second support 40, the arm 46 of which is actuated by a robot, has risen and has taken charge of the glass 47, offloading it from the first support 41. This is rendered possible thanks to the passage in the chassis 41 allowing the arm 46 of the second support 40 to pass and thanks to the fact that the support elements 43 (second support) and 48 (first support) are offset when seen from above, the support elements 43 extending outward from the chassis 42 whereas the support elements 48 extend inward from the chassis 50. The upper part of the chassis 50 does not impede the rising of the support 40 because it entirely circumscribes the second support (apart from the arm). As the support 40 rises, the support elements 43 on the one hand and the support elements 48 on the other hand therefore cross over in the manner of the teeth of two combs. The support elements 43 and 48 preferably have their contact zone adapted to the shape of the glass that they receive, that is to say that their contact zone is oriented like the glass and is therefore substantially parallel to the supported zone of the glass. These support elements may further include a spring to damp the reception of the glass at the moment of taking charge of it.

FIG. 5 shows, seen from above and in orthogonal projection in a horizontal plane, the supports 40 and 41 from FIG. 4 at the moment of the transfer of the glass 47 from one support to the other. This glass has four bands non-parallel two by two. It is seen that:

the chassis of the second support 40 is circumscribed by the chassis of the first support 41 (except for the arm 46);

the chassis of the second support 40 is circumscribed by the contact zones 51 of the support elements 48 of the first support;

the support elements 48 of the first support extend inward from the chassis 41 of the first support;

the support elements 43 of the second support extend from the chassis 40 of the second support;

the support elements of the two supports are offset when seen from above;

support elements of the two groups (group of support elements 48 of the first support and group of support elements 43 of the second support) are interleaved when seen from above, most of the elements of one group having as neighbors two elements of the other group;

the contact zones of all the support elements come into contact with the glass in a contact band delimited by an exterior first line 58 located at distance d1 from the edge of the glass and an interior second line 59 situated at a distance d2 from the edge of the glass, d1 being able in particular to be zero or preferably at least 50 mm and preferably at least 6 cm and even at least 7 cm and d2 in particular being able to be at most 200 mm or preferably at most 170 mm and even at most 150 mm.

It can be seen that the following situation is repeated numerous times: the support element 51 of the first support comes to intersect the straight line tangential to the exterior edges of two adjacent contact zones 55 and 56 of the second support, the intersection occurring between the contact zones 55 and 56. It can also be seen that the following situation is repeated numerous times: two adjacent support elements of one of the supports are such that the straight line segment passing through the center of their contact zone passes through the contact zone of the other support. This is the case in particular of the straight line segment 57 passing through the center of the contact zones 55 and 56 of the second support and through the contact zone 51 of the first support. The structural elements that have just been mentioned show the interleaving of the contact zones of the two supports enabling them to cross like the teeth of two combs during the vertical movement leading to the transfer of glass from one support to the other.

FIG. 6 represents a view from above of the same device as FIG. 5, the two supports being in the transfer situation. The same elements in FIGS. 5 and 6 bear the same references. The imaginary line 62 is the support interior contour of the first support, touching, when seen from above (in orthogonal projection in the horizontal plane) all the contact zones 51 of the first support. The virtual line 60 is the support exterior contour of the second support, which surrounds and touches, when seen from above (in orthogonal projection in the horizontal plane) all the contact zones 63 of the second support. It is seen that more than 90% of the support exterior contour of the second support is outside the support interior contour of the first support (this respective position of the two contours not applying only in the top right and top left corners of FIG. 6). The two groups of support elements are interleaved when seen from above and the contact zones of the two supports support the glass at substantially the same distance from the edge of the glass in the same contact band. The width 53 of the passage is less than 20% of the length of the line 62. The passage is entirely inside one side of the first support and of the glass when seen from above, the supports being in the transfer situation.

FIG. 7 shows a support element 70 that can equip a support according to the invention. In FIG. 7 *a*), the support element 70 has at a lower end a base 71 with orifices enabling it to be fixed to a chassis (not shown). The other end includes a shoe including a saucer 72 to receive a fibrous material 79 to come into contact with the glass to be supported, in particular made of glass. This open texture refractory material (it is referred to as open textured because air can pass easily through its mesh, the saucer 72 even being visible through the mesh), termed "tempering knitted material", is retained on the surface of the element by lugs 73, as may be seen in FIG. 7 *c*). The contact zone 78 is mobile in translation in a direction that is perpendicular to it and its downward movement is accompanied by the compression of a spring 74 forming a mobility member between the base and the shoe formed by the combination of the saucer 72 and the fibrous material 79. This movement in a direction perpendicular to the contact zone 78 is the only degree of freedom of the shoe relative to the chassis. In practice, it may be useful to orient this element so that the axis of the spring is substantially perpendicular to the locally supported zone of the received glass, in order for the contact zone 78 to be substantially parallel to that locally supported surface. The reception of the glass by the contact zone 78 is therefore damped by the spring 74. In FIG. 3 *b*), there is seen the same support element as in FIG. 3 *a*) except that the spring 74 has been removed together with the part including the base 71. It is seen in this FIG. 3 *b*) that a cup 75 is able to receive the spring 74. It is likewise seen that the rod 76 is guided in the tube 77 so that the contact zone can be moved only in a direction corresponding to the axis of the tubular guide 77. In FIG. 3 *c*) is seen the support element 70 covered with a knitted material type refractory fibrous material 79 retained by the lugs 73 and forming the contact zone 78.

FIG. 8 shows a mobile support element 80 that can equip a support according to the invention. It is designed to be fixed to a chassis by a base 86. This element is globally similar to that from FIG. 7 except that the spring 81 is a corrugated spring and is not guided in the direction of its axis. It can therefore be compressed in the direction 82 of its axis but this spring additionally offers degrees of freedom 83 of tilting of the shoe to any side around the axis of the spring. On contact with the glass to be received, the contact zone 84 (which has to be equipped with a refractory fibrous material retained by the lugs 85 like the element from FIG. 7 *c*)) is automatically oriented to become parallel to the local surface of the supported glass.

The invention claimed is:

1. A device for supporting a sheet of glass or a stack of sheets of glass in a contact band between an edge of the glass and up to 200 mm from the edge of the glass, without contacting the glass beyond 200 mm from the edge of the glass, the device comprising a first support and a second support, each of the first and second supports comprising a chassis and a support system adapted to support the glass connected to the chassis, the support system of each of the first and second supports comprising a support surface for supporting the glass comprising a fibrous material able to contact the glass in the contact band at a temperature between 400 and 600° C., the first and second supports being able to be moved in a transfer vertical relative movement enabling the support surface of one to pass over or under the support surface of the other in order to transfer the glass from one of the first and second supports to the other one of the first and second supports, the support system of the first support comprising a passage able to allow to pass an arm connected to the second support during the transfer vertical relative movement.

2. The device as claimed in claim 1, wherein the support surface of the first support forms four sides, the passage for allowing the arm to pass being entirely included in one side.

3. The device as claimed in claim 1, wherein the passage has a width in the range from 5 cm to 65 cm.

4. The device as claimed in claim 1, wherein a width of the passage is less than 20% of a support interior perimeter of the first support.

5. The device as claimed in claim 1, wherein the fibrous material is of the open texture knitted material type.

6. The device as claimed in claim 1, wherein the arm connected to the second support is manipulated by a robot able to move the second support horizontally and vertically by means of the arm.

7. The device as claimed in claim 1, wherein the support system of one of the first and second supports comprise a plurality of support elements fixed to the chassis and each comprising a glass contact zone, the glass contact zones of the support elements forming a discontinuous surface to support the glass.

8. The device as claimed in claim 7, wherein the support system of the first and second supports each comprise a plurality of support elements fixed to the chassis and each comprising a glass contact zone, the glass contact zones of the support elements of the first and second supports forming a discontinuous surface for supporting the glass.

9. The device as claimed in claim 8, wherein each of the first and second supports comprises 4 to 25 support elements.

10. The device as claimed in claim 8, wherein
the support elements of the first support are directed starting from the chassis toward an interior of the chassis of the first support, the support elements of the second support are directed starting from the chassis toward an exterior of the chassis of the second support, the support elements of the first and second supports are offset as seen from above during the transfer vertical relative movement.

11. The device as claimed in claim 8, wherein during the transfer vertical relative movement, as seen from above, at least one support element of the first support intersects a straight line tangential to exterior edges of two glass contact zones of adjacent support elements of the second support, the intersection occurring between the two adjacent support elements.

12. The device as claimed in claim 8, wherein during the transfer vertical relative movement there exists, as seen from above, at least two adjacent support elements of one of the first and second supports such that a straight line segment passing through a center of their glass contact zone passes through a support element of the other one of the first and second supports.

13. The device as claimed in claim 8, wherein the support exterior contour of the second support is at least in part outside the support interior contour of the first support.

14. The device as claimed in claim 8, wherein an area of each glass contact zone of each support element of each support is in the range from 50 to 20 000 mm$^2$.

15. The device as claimed in claim 1, wherein the support system of the first support is a peripheral track and wherein the support system of the second support comprises a plurality of support elements fixed to the chassis each comprising a glass contact zone, the glass contact zones forming a discontinuous surface for supporting the glass, the glass contact zones of the second support being circumscribed as seen from above by the peripheral track during the transfer vertical relative movement.

16. A method for supporting a sheet of glass or a stack of sheets of glass in a contact band between an edge of the glass and up to 200 mm from the edge of the glass, without contacting the glass beyond 200 mm from the edge of the glass, the method comprising:
supporting the glass by one of a first and a second support, each of the first and second supports comprising a chassis and a support system adapted to support the glass connected to the chassis, the support system of each of the first and second supports comprising a surface for supporting the glass comprising a fibrous material able to contact the glass in the contact band at a temperature between 400 and 600° C., the first and second supports being able to be moved in a transfer vertical relative movement enabling the support surface of one to pass over or under the support surface of the other in order to transfer the glass from one of the first and second supports to the other one of the first and second supports, the support system of the first support comprising a passage able to allow to pass an arm connected to the second support during the transfer vertical relative movement, then
relative positioning of the first and second supports so that the first and second supports are under the glass, then
executing the transfer vertical relative movement of the first and second supports to transfer the glass from one of the first and second supports to the other one of the first and second supports, during which the arm connected to the second support passes through the passage of the support system of the first support.

17. The method as claimed in claim 16, wherein each of the support system of the first and second supports comprises a plurality of support elements fixed to the chassis and each comprising a glass contact zone, the glass contact zones of the support elements of the first and second supports forming a discontinuous surface for supporting the glass, the support surfaces of the first and second supports coming into contact with the lower face of the glass exclusively in a contact band the limits of which are:
exterior limit of the band: at least 50 mm from the edge of the glass,
interior band limit: at most 200 mm from the edge of the glass.

18. The method as claimed in claim 17, wherein the area of each contact zone of each support element of each support is in the range from 50 to 5500 mm$^2$ and wherein at the moment of transfer, as seen from above, contact zones of the first and second supports are seen to be interleaved in the contact band.

19. The method as claimed in claim 16, wherein the glass has four sides.

20. The method as claimed in claim 19, wherein the passage of the support system of the first support is entirely included under one side of the glass.

21. The method as claimed in claim 16, wherein the transfer of the glass from one support to the other occurs when the glass is at a temperature between 400 and 600° C.

22. The method as claimed in claim 16, wherein the arm connected to the second support is manipulated by a robot capable of moving the second support horizontally and vertically by means of the arm, the relative positioning of the first and second supports and the vertical relative movement of the first and second supports being effected by movement of the second support by the robot and by the arm.

23. A method for supporting a sheet of glass or a stack of sheets of glass in a contact band between an edge of the glass and up to 200 mm from the edge of the glass, without contacting the glass beyond 200 mm from the edge of the glass, the method comprising:
supporting the glass by one of a first and a second support, each of the first and second supports comprising a chassis and a support system adapted to support the glass connected to the chassis, the support system of each of the first and second supports comprising a surface for supporting the glass comprising a fibrous material able to contact the glass in the contact band at a temperature between 400 and 600° C., the first and second supports being able to be moved in a transfer vertical relative movement enabling the support surface of one to pass over or under the support surface of the other in order to transfer the glass from one of the first and second supports to the other one of the first and second supports, the support system of the first support comprising a passage able to allow to pass an arm connected to the second support during the transfer vertical relative movement, then
relative positioning of the first and second supports so that the first and second supports are under the glass, then
executing the transfer vertical relative movement of the first and second supports to transfer the glass from one of the first and second supports to the other one of the first and second supports, during which the arm connected to the second support passes through the passage of the support system of the first support,
wherein the support system of the first support is a peripheral track and wherein the support system of the second support comprises a plurality of support elements fixed to the chassis each comprising a glass contact zone, the glass contact zones forming a discontinuous surface for supporting the glass, the glass contact zones of the second support being circumscribed as seen from above by the peripheral track during the transfer vertical relative movement.

* * * * *